(12) United States Patent  (10) Patent No.: US 7,785,751 B2
Yamamoto et al.  (45) Date of Patent: Aug. 31, 2010

(54) PRODUCTION METHOD OF ELECTROLYTE MEMBRANE, ELECTROLYTE MEMBRANE AND SOLID POLYMER FUEL CELL USING SAME (75) Inventors: Kazushige Yamamoto, Ibaraki (JP); Hideyuki Emori, Ibaraki (JP); Masao Abe, Ibaraki (JP); Kinkou Sho, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/720,742

(22) PCT Filed: Nov. 29, 2005

(86) PCT No.: PCT/JP2005/021831

§ 371 (c)(1),
(2), (4) Date: Aug. 3, 2009

(87) PCT Pub. No.: WO2006/059582

PCT Pub. Date: Jun. 8, 2006

(65) Prior Publication Data

US 2009/0297909 A1 Dec. 3, 2009

(30) Foreign Application Priority Data

Dec. 3, 2004 (JP) ............................. 2004-351572
Jan. 7, 2005 (JP) ............................. 2005-002352

(51) Int. Cl.
*H01M 8/10* (2006.01)
*B01J 39/20* (2006.01)
(52) U.S. Cl. ............................. 429/493; 521/27; 521/38
(58) Field of Classification Search .................... 429/30, 429/33; 521/27, 38
See application file for complete search history.

(56) References Cited

U.S. PATENT DOCUMENTS 5,635,041 A 6/1997 Bahar et al.

(Continued)

FOREIGN PATENT DOCUMENTS

CA 2478530 9/2003

(Continued)

OTHER PUBLICATIONS

International Search Report issued on the corresponding PCT Application No. PCT/JP2005/021831, dated Mar. 14, 2006.

(Continued)

*Primary Examiner*—Stephen J. Kalafut
(74) *Attorney, Agent, or Firm*—Knobbe Martens Olson & Bear LLP (57) ABSTRACT

Disclosed is an electrolyte membrane which enables a fuel cell to have a high maximum output when used therein since it has high proton conductivity and high hydrogen gas impermeability. Also disclosed are a method for producing such an electrolyte membrane, and a solid polymer fuel cell using such an electrolyte membrane. A method for producing an electrolyte membrane including a step for impregnating a porous base with a solution containing a sulfonic acid group-containing vinyl monomer and then polymerizing the monomer is characterized in that 80% by mole or more of vinyl sulfonic acid having purity of 90% or more, and/or a salt thereof is contained as the sulfonic acid group-containing vinyl monomer, and the concentration of the vinyl sulfonic acid and/or a salt thereof in the solution is set at 35% by weight or more.

12 Claims, 2 Drawing Sheets

U.S. PATENT DOCUMENTS

| | | | |
|---|---|---|---|
| 6,248,469 B1 | 6/2001 | Henley et al. | |
| 7,001,929 B2* | 2/2006 | Goto et al. | 521/27 |
| 7,037,950 B2* | 5/2006 | Kim | 521/27 X |
| 2005/0118477 A1* | 6/2005 | Kiefer et al. | 429/33 |

FOREIGN PATENT DOCUMENTS

| | | |
|---|---|---|
| CA | 2485507 | 11/2003 |
| DE | 10209685 | 9/2003 |
| EP | 1487041 | 12/2004 |
| JP | 1022932 | 1/1989 |
| JP | 6-342665 | 12/1994 |
| JP | 11-310649 | 11/1999 |
| JP | 2001-135328 | 5/2001 |
| JP | 2001-514431 | 9/2001 |
| JP | 2004-146279 | 5/2004 |
| JP | 2004-307712 | 11/2004 |
| JP | 2004-335119 | 11/2004 |
| JP | 2005-519428 | 6/2005 |
| JP | 2005-525682 | 8/2005 |
| WO | WO 99/10165 | 3/1999 |
| WO | WO 03/074597 | 9/2003 |
| WO | WO 03/075386 | 9/2003 |
| WO | WO 03/096464 | 11/2003 |

OTHER PUBLICATIONS

Supplementary European Search Report issued in the corresponding European Patent Application No. 05811703.7, dated Feb. 16, 2010.

* cited by examiner

PRODUCTION METHOD OF ELECTROLYTE MEMBRANE, ELECTROLYTE MEMBRANE AND SOLID POLYMER FUEL CELL USING SAME

This application is the U.S. National Phase under 35 U.S.C. §371 of International Application No. PCT/JP2005/021831, filed Nov. 29, 2005, which claims priority to the Japanese Patent Applications No. 2004-351572, filed Dec. 3, 2004 and No. 2005-002352, filed Jan. 7, 2005. The International Application was not published in English under PCT Article 21(2).

TECHNICAL FIELD

The present invention relates to an electrolyte membrane in which small pores in a porous base are filled with a proton conductive polymer, a method of producing the same, and a solid polymer fuel cell using the same, and is especially useful for a solid polymer fuel cell using methanol and hydrogen as a fuel.

BACKGROUND ART

With an appeal to the anxiety about the global environment, the prevention of emission of so-called greenhouse gasses and $NO_x$ has been strongly desired. In order to reduce the total emission of these gasses, turning a fuel cell system for automobiles to practical use is considered to be very effective. With the global-level information network becoming very important these days, the fuel cell system is desired also to ensure the energy that is important for the realization of a mobile environment and a ubiquitous society.

A solid polymer fuel cell (PEFC, Polymer Electrolyte Fuel Cell) has an excellent characteristic that only water is generated with a low temperature operation, a high output density, and a power generation reaction. Because a high output can be obtained in a PEFC by pure hydrogen, it is expected to be especially used in automobiles, and hydrogen energy environment maintenance such as a hydrogen station is proceeding. Further, because a PEFC of methanol fuel can be supplied as a liquid fuel similar to gasoline, it is considered to be promising as a power supply source for an electric automobile and a portable apparatus.

Besides the type using pure hydrogen gas, there exist two types of the above-described solid polymer fuel cell of a reformation type in which methanol is transformed into gas having hydrogen as the main component using a reforming device and of a direct type of using methanol directly without using the reforming device (DMFC, Direct Methanol Polymer Fuel Cell). Although the reforming device is necessary in the reformation type, the output is large and the range of application devices is broad. On the other hand, because the reforming device is not necessary in the direct type, it is possible to be made lightweight and there is an advantage such that catalyst poisoning becomes no problem.

A cation exchange membrane is generally used for the electrolyte membrane of the above-described DMFC, and a perfluorocarbon sulfonic acid membrane represented by Nafion (registered trademark) has been mainly used. Although this film is excellent in chemical stability, strength is weak and there is a problem in cell durability because methanol permeates easily and has a high swellability. Further, because it is very expensive, it has been questioned in the side view of practicality.

Because of this, a cation exchange membrane is disclosed that is made by filling the voids of a polyolefin-based porous membrane with a high molecular weight of weight average molecular weight of 500,000 or more with a cation exchange resin (for example, refer to Patent Document 1). Further, in order to reinforce the perfluorocarbon sulfonic acid membrane, an example using a fluorine-based porous membrane as a core material is disclosed (for example, refer to Patent Document 2).

Further, an electrolyte membrane is disclosed in which a mixture of a sulfonic acid group-containing vinyl monomer and a crosslinking agent is impregnated into a crosslinking polyolefin-based porous base and then is polymerized as a membrane in which the ability to suppress methanol permeation of these electrolyte membranes is improved and the output characteristics are consistent (for example, refer to Patent Document 3). In this Document, 2-acrylamide-2-methylpropane sulfonic acid is mainly used as the sulfonic acid group-containing vinyl monomer in the example. However, it was found out that the proton conductivity is insufficient. Further, the case is also disclosed in which a small amount (about 20% by weight) of vinylsulfonic acid is used as a copolymerization monomer in other examples.

However, sodium vinylsulfonate and vinylsulfonic acid that are on the market in general contain impurities such as sodium hydroxyethane sulfonate and hydroxyethane sulfonic acid, and the purity of vinylsulfonic acid is 75% or less. Because of this, even when vinylsulfonic acid is impregnated into a porous base and then the homopolymer or the crosslinking body is polymerized, the polymerization does not proceed sufficiently and a polymer that functions as the proton conductive polymer can not be obtained.

On the other hand, an electrolyte membrane is disclosed in which the permeation of hydrogen gas is suppressed using perfluorocarbon sulfonic acid (for example, refer to Patent Document 4). However, because the hydrogen gas permeability coefficient of this electrolyte membrane is about the same value as that of a perfluorocarbon sulfonic acid membrane represented by Nafion (registered trademark), it cannot be mentioned that the permeation is sufficiently suppressed. Furthermore, the output of fuel cell obtained using the electrolyte membrane is about 600 mW/cm$^2$, and it cannot be mentioned that sufficient cell characteristics are obtained.

Further, an example of the electrolyte membrane is disclosed in which a porous base is filled with an aromatic polymer and then a sulfonation is performed as a membrane in which the ability to suppress hydrogen gas permeation of these electrolyte membranes is improved and the proton conductivity is consistent (for example, refer to Patent Documents 5 and 6). However, the permeability coefficient of hydrogen gas is reduced to about $2/3$ to $1/2$ compared with a perfluorocarbon sulfonic acid membrane, and it cannot be not mentioned that the permeation of the hydrogen gas is sufficiently suppressed.

As described above, the electrolyte of PEFC is requested to have 1) impermeability of hydrogen, methanol, etc. (hydrogen and methanol don't permeate the electrolyte), 2) durability and heat resistance, 3) no or less change in the area due to liquid wetting and drying to the membrane at the start and the finish, and 4) proton conductivity, and 5) chemical resistance, etc. However, production of the electrolyte membrane that sufficiently satisfies these requirements has not been developed.

Patent Document 1: Japanese Patent Application Laid-Open (JP-A) No. 01-22932

Patent Document 2: U.S. Pat. No. 5,635,041

Patent Document 3: JP-A No. 2004-146279

Patent Document 4: JP-A No. 06-342665

Patent Document 5: JP-A No. 2001-135328

Patent Document 6: JP-A No. 11-310649

DISCLOSURE OF THE INVENTION

Problems to be Solved by the Invention

Therefore, the objective of the present invention is to provide an electrolyte membrane which enables a fuel cell to have a high maximum output when used therein since it has high proton conductivity and high hydrogen gas impermeability, a method for producing such an electrolyte membrane, and a solid polymer fuel cell using such an electrolyte membrane.

Means to Solve the Problems

The inventors of the present invention devoted themselves to study a method for effectively polymerizing vinylsulfonic acid and/or a salt thereof in small pores of the porous base in order to achieve the above-described objective, found out that a polymer having high proton conductivity and good hydrogen gas impermeability can be obtained by using a highly-concentrated vinylsulfonic acid solution purified to have high purity, and lead the present invention to be completed.

That is, a method for producing an electrolyte membrane in the present invention including a step for impregnating a porous base with a solution containing a sulfonic acid group-containing vinyl monomer and then polymerizing the monomer is characterized in that 80% by mole or more of vinyl sulfonic acid having purity of 90% or more and/or a salt thereof is contained as the sulfonic acid group-containing vinyl monomer, and the concentration of the vinyl sulfonic acid and/or a salt thereof in the solution is set at 35% by weight or more. In the present invention, "a sulfonic acid group" means that —$SO_3H$ group (a sulfo group) and —$SO_3^-$ are contained.

According to the method for producing an electrolyte membrane in the present invention, as shown in the result of Examples, a polymer containing a main chain in which vinylsulfonic acid is polymerized can be obtained, and an electrolyte membrane with high proton conductivity can be obtained in which a high output can be obtained in a fuel cell using methanol and hydrogen as a fuel. The detail of its reason is not obvious. However, it can be supposed as follows. In the polymer containing a main chain in which vinylsulfonic acid is polymerized, it is mentioned that the proton conductivity can be increased because a sulfonic acid group is easily arranged in a straight chain form and in high density, that a change of swelling among molecular chains is hard to occur because a packing of the main chain occurs easily and a harder polymer can be produced, etc. Hereby, the hydrogen gas impermeability is considered to become good.

In the description above, the above-described solution preferably contains a crosslinking agent at a ratio of 1 to 30 moles to the above-described sulfonic acid group-containing vinyl monomer 100 moles. By containing the crosslinking agent with this ratio, swellability and solubility of the proton conductive polymer can be suppressed and heat resistance can be improved.

Further, prior to the above-described polymerization, a step for performing a degassing with an operation under reduced pressure from the porous base impregnated with the above-described solution is preferably included. Hereby, because the filling ratio and the filling amount of the proton conductive polymer can be increased, the proton conductivity and the hydrogen gas impermeability can be increased more.

In that case, the above-described porous base is preferably made by crosslinking a resin composition including a first polymer containing a polyolefin with weight average molecular weight of 500,000 or more and a second polymer having a reactive functional group. By using such porous base, the hydrogen gas impermeability can be increased more certainly.

On the other hand, the electrolyte membrane in the present invention is characterized in that small pores of the porous base are filled with a proton conductive polymer containing 80% by mole or more of vinyl sulfonic acid and/or a salt thereof in the sulfonic acid group-containing vinyl monomer that is a constitution component. For the above-described reason, the electrolyte membrane in the present invention becomes an electrolyte membrane in which a high output can be obtained in a fuel cell using methanol and hydrogen as a fuel especially because the proton conductivity is high and the hydrogen gas impermeability is also good.

In the description above, the above-described proton conductive polymer has vinylsulfonic acid and/or a salt thereof and a crosslinking agent as the constitution components, and preferably contains a crosslinking agent at the ratio of 1 to 30 moles to 100 moles of the vinylsulfonic acid and/or a salt thereof. In this case, because the main chain is made by polymerizing only vinylsulfonic acid and/or a salt thereof, the proton conductivity can be increased more. Further, by containing the crosslinking agent with this ratio, swellability and solubility of the proton conductive polymer can be suppressed and heat resistance can be improved.

Further, the above-described porous base is made by crosslinking a resin composition including a first polymer containing a polyolefin with weight average molecular weight of 500,000 or more and a second polymer having a reactive functional group, and the permeability coefficient of hydrogen gas at 30° C. is preferably $3.0 \times 10^{-9}$ [$cm^3$ (STP)·cm/(s·$cm^2$·cmHg)] or less. The various physical property values in the present invention are values specifically measured with the measuring method described in the Examples.

In that case, 100 parts by weight of the above-described porous base is preferably filled with 80% by weight or more of the above-described proton conductive polymer. Hereby, because the filling density is increased, the proton conductivity and the hydrogen gas impermeability can be improved more.

On the other hand, the solid polymer fuel cell in the present invention is made by using any of the electrolyte membranes described above. In the solid polymer fuel cell in the present invention, because the proton conductivity of the electrolyte membrane is high, a high output can be obtained when methanol and hydrogen are used as a fuel. Because the solid polymer fuel cell in the present invention has high hydrogen gas impermeability, it is useful as a solid polymer fuel cell using hydrogen as a fuel besides the use as a methanol fuel type solid polymer fuel cell expected in the use in a portable equipment.

BEST MODE FOR CARRYING OUT THE INVENTION

The method for producing the electrolyte membrane in the present invention includes a step for impregnating a porous base with a solution containing a sulfonic acid group-containing vinyl monomer and then polymerizing the monomer.

An example of the porous base is a porous film such as a polyolefin-based resin, PVDF (polyvinylidene fluoride), PSF (polysulfone), PES (polyethersulfone), PPES (polyphenylsulfone), PTFE, a cellulose-based resin, polyamide, polyacrylonitrile, and polyimide.

The method for producing a film of the porous base may be any of a non-solvent induction type wet phase separation method, a thermal induction type wet phase separation method, a dry phase separation method, an open pore drawing method, a solvent extraction method, etc. Among these, a porous film having a polyolefin-based resin as a main component is preferably used that is obtained with a producing method including a step for melting and kneading a resin composition containing a polyolefin-based resin and a solvent thereof, obtaining a sheet-formed composition by cooling the obtained molten and kneaded composition, and then drawing the composition to the direction of one axis or more. Below, the explanation is performed by using this porous film as an example.

This porous film preferably includes 1) at least one kind of a first polymer selected from a group consisting of polyolefins and 2) a second polymer having a reactive functional group in a polymer thereof. Especially, the above-described porous base is preferably made by crosslinking a resin composition including a first polymer containing a polyolefin with weight average molecular weight of 500,000 or more and a second polymer having a reactive functional group.

Examples of the first polymer include polyolefins such as polyethylene, polypropylene, polybutylene, and 4-methylpentene. Further, polyolefins may be used in which a carbonyl group, an acid anhydride group, etc. are graft-polymerized. Further, the first polymer may contain a polyolefin-based thermoplastic elastomer that contains a crystalline phase and in which the stress relaxation temperature is easily adjusted. These may contain a structure in which a polyolefin base is modified.

Among these, the first polymer is preferably polyethylene because of contamination resistance, corrosion resistance, less expensive, etc. Especially, high density polyethylene, low density polyethylene, polyethylene with ultra high molecular weight polyethylene, etc. are preferable. The high density polyethylene and the ultra high molecular weight polyethylene are more preferable in the respect of the strength of the obtained porous base.

Among these, in the point of view of increasing the strength of the porous film, the ultra high molecular weight polyethylene with weight average molecular weight of 500,000 or more is preferably used. These polyolefin-based resins may be used alone or by mixing two kinds or more.

Furthermore, the porous base in the present invention may include a second polymer having a reactive functional group in a polymer thereof. Examples of the second polymer having a reactive functional group include a polymer having a double bond, a polymer in which an acid anhydride group, etc. are grafted, and a polymer having an epoxy group.

The second polymer having a double bond in the polymer may include at least one kind of the second polymer for example in polynorbornen, ethylene-propylene-terpolymer, and polybutadiene. The second polymer include a ring-opened polymer of bicyclo[3.2.0]hept-6-en, bicyclo[4.2.0]oct-7-en, and these derivatives; norbornene derivatives such as bicyclo[2.2.1]hept-5-en (also referred to "norbornene" in the present specification) and bicyclo[2.2.1]hept-5-en-2,3-dicarboxymethylester; a ring-opened polymer of bicyclo[2.2.2]oct-2-en and its derivatives; a ring-opened polymer of dicyclopentadiene, tetracyclododecene, and these derivatives, ethylene-propylene-terpolymer, and polybutadiene. The above-described ethylene-propylene-terpolymer consists of a terpolymer of ethylene, propylene, and diene monomers, and has an aliphatic ring and a double bond originated to its diene monomer unit in its main chain. Further, the polymer may have a part of its double bond hydrogenated. In the above-described terpolymer of ethylene, propylene, and diene monomers, examples of the diene monomer includes dicyclopentadiene, ethylidene norbornene, and hexadiene.

Among these, an aliphatic ring skeleton is preferable, and among these, ethylidene norbornene is more preferable in the respect of crosslinking reactivity. The terpolymer made by using these diene monomers may be a polymer in which a single diene monomer is used or two kinds or more of the diene monomers are mixed and used.

The above-described ethylene-propylene-terpolymer desirably has an intricated structure of complex molecular chains for a three-dimensional crosslinking structure as a polyolefin resin composition, the ethylene-propylene-terpolymer of high molecular weight having a certain molecular weight or more is preferable.

An ethylene-propylene-terpolymer having a Mooney viscosity ($ML_{1+4}$ (100° C.)) of 50 or more is preferable as a rough idea of this high molecular weight. If it is 50 or more, it is preferably used in the point of view of dispersibility with a polyolefin-based resin.

Further, in the case of using polybutadiene, the polybutadiene includes cis-1,4-polybutadiene, trans-1,4-polybutadiene, and 1,2-polybutadiene. The polybutadiene having many cis-1,4-polybutadiene skeletons is preferable in the respect that it can easily take a flexural structure and in the respect that a reaction of the double bond can easily proceed. Especially, the polybutadiene having the rate of the cis-1,4-polybutadiene skeleton of 30% or more is preferable.

Examples of the grafted polymer include graft-polymerized polyolefins, high-density polyethylene, low-density polyethylene, polypropylene, and EVA. However, from the respect of compatibility, etc., maleic anhydride graft polyethylene can be more preferably used. These polyolefin-based graft polymers may be used together as the first polymer. In the case of using the second polymer, the amount of the second polymer is 1 to 50 parts by weight, preferably 1 to 40 parts by weight, and more preferably 1 to 35 parts by weight when the combined amount of both the first polymer and the second polymer is 100 parts by weight.

Moreover, additives such as an anti-oxidizing agent, a UV ray absorber, dye, pigment, an anti-static agent, and a nucleating agent can be added in the resin composition of the above-described porous base depending on necessity and in the range of not failing the objective of the present invention.

The solvent used in the production of the above described porous film is not especially limited as long as dissolution of a polyolefin resin is possible. However, a solvent having a coagulation point of $-10°$ C. or less can be preferably used. The preferred specific examples of such a solvent include aliphatic or alicyclic hydrocarbon such as decane, decalin, and liquid paraffin, and mineral oil fraction whose boiling point corresponds to these hydrocarbons. The mixing ratio of a polyolefin and the solvent cannot be determined unconditionally. However, the resin concentration of 5 to 30% by weight is preferable. In the case that the resin concentration is this value or more, there becomes insufficient kneading, and sufficient crosslinking of the polymer chains becomes difficult to be obtained.

The void ratio of the porous base used in the present invention is preferably 10 to 70%, more preferably 15 to 65%, and especially preferably 15 to 60%. Further, the thickness of the porous base is preferably 100 μm or less, more preferably 1 to 80 μm, and especially preferably 5 to 70 μm.

The producing method in the present invention includes a step for impregnating the porous base as described above with a solution containing a sulfonic acid group-containing vinyl monomer and then polymerizing the monomer. In that case, prior to the above-described polymerization, a step for performing a degassing with an operation under reduced pressure from the porous base impregnated with the above-described solution is preferably included.

The method for impregnating such porous base with a solution containing a sulfonic acid group-containing vinyl monomer can be performed with various coating methods such as a soaking method, a spray coating, and a blade coating. In the case of using an aqueous solution of the above-described monomer, prior to this, a hydrophilization treatment is preferably performed on the porous base. The hydrophilization treatment of the porous base can be performed using an aqueous solution of a surfactant such as anion-based.

The operation under reduced pressure can be performed, for example, with a method of reducing pressure of the container and all at the state of impregnating the porous base in the solution, a method of taking out the porous base impregnated with the solution and then reducing pressure, etc. In the case of performing the pressure reduction at room temperature, a solution having a boiling point of 90° C. or more is preferably used.

Furthermore, the polymerization of a sulfonic acid group-containing vinyl monomer, etc. can be performed with the method as follows. In the present invention, the steps of the above-described impregnation, degassing, and polymerization may be performed by repeating two times or more, and in this case, these steps are preferably repeated until the porous base is filled with 80 parts by weight or more of the proton conductive polymer to 100 parts by weight of the porous base.

When the monomers are polymerized, the polymerization may be performed in the state where the reactive group remains after a desolventizing treatment of the above-described porous base, or the crosslinking and the polymerization reaction can be performed after the crosslinking reaction of the second polymer is performed completely. In the case of performing the crosslinking or the polymerization reaction on the monomers in the state where the reactive group remains, the electrolyte membrane can be produced in which the porous base and the proton conductive polymer (hereinafter, referred to as "a third polymer") with which the porous base is filled are chemically bonded.

A part or all parts of the first, the second, and the third polymers are preferably crosslinked in the aspects of heat resistance and film strength. Moreover, the crosslinking depends on the third polymer and its monomer. However, one kind or more selected from a group of heat, a UV ray, and an electron beam can be used.

Moreover, in the case of performing the crosslinking treatment using heat, various methods can be used such as a one-step heat treatment method of performing the heat treatment one time, a multi-step heat treatment method of performing at low temperature first and then at high temperature, and a temperature-rising heat treatment method of performing with increasing temperature. However, the treatment is desirably performed without failing various characteristics of the base film and the inner filling film in the present invention by considering reactivity of the third polymer or monomer existing in the base, or the like. The temperature of the heat treatment is 40 to 140° C., and preferably 90 to 140° C. The treatment time is preferably about 0.5 to 14 hours. These can be further optimized by appropriately changing the reaction temperature and time depending on characteristics of the third polymer or monomer with which the base is filled.

In the case of performing the crosslinking treatment using a UV ray, a porous film, that is, the base in the present invention, for example, is filled with a sulfonic acid group-containing vinyl monomer, etc., and the film itself or after the film is impregnated in a methanol solution etc. containing a polymerization initiator and the solvent is dried, the crosslinking or the polymerization treatment can be performed by irradiating this base with a mercury lamp, etc.

In the case of performing the crosslinking treatment using an electron beam, for example, the porous base is filled with the third polymer, monomer or the like, and the crosslinking treatment can be performed by irradiating the base in the present invention with radiation dose of 0.1 to 10 Mrad. The atmosphere at the irradiation may be under an air atmosphere the same as the heat treatment method, or under an inert gas atmosphere such as nitrogen gas and argon gas with a motivation to control the crosslinking state.

The present invention is characterized in that 80% by mole or more of vinyl sulfonic acid having purity of 90% or more, and/or a salt thereof is contained as the sulfonic acid group-containing vinyl monomer included in the above-described solution, and the concentration of the vinyl sulfonic acid and/or a salt thereof in the above-described solution is set at 35% by weight or more.

Therefore, the third polymer contains 80% by mole or more of vinyl sulfonic acid and/or a salt thereof as a constituting component. Hereby, a group having a proton and that is capable of easily liberating it such as —$SO_3$— originated from a —$SO_3H$ group exists in a pendant form in the third polymer and the polymer fills the pores, whereby the proton conductivity is generated.

The salt of vinylsulfonic acid is preferably sodium vinylsulfonate. In the case of using a salt type such as a sodium salt as a monomer, these salts may be made to a proton type after the monomer is made to a polymer.

In the present invention, less than 20% by mole of other monomer components may be contained, and such monomer components preferably include sodium allylsulfonate (SAS), sodium methallylsulfonate (SMS), p-styrene sodium sulfonate (SSS), acrylic acid (AA), and 2-acrylamide-2-methylpropane sulfonic acid.

In the present invention, by impregnating high purity vinylsulfonic acid and/or its salt with a high-concentration solution, the single polymerization in which the polymerization was difficult or the crosslinking polymerization by adding a crosslinking agent are promoted and a dense polymer can be obtained. In the electrolyte concentration containing this vinylsulfonate acid, the concentration of vinylsulfonic acid in the solution is 35% by weight or more, preferably 50 to 90% by weight, and more preferably 70 to 90% by weight. When the solution concentration is too low, the polymerization becomes insufficient, filling to the porous base becomes insufficient, and the uniformity of the electrolyte membrane deteriorates.

Further, vinylsulfonic acid to be used preferably has high purity, a single polymerization or crosslinking and polymerization by adding a crosslinking agent is promoted, and a dense polymer is easily obtained. The purity of this vinylsulfonic acid is preferably 90% or more, and more preferably 95% or more.

The reason why a polymer having vinylsulfonic acid as a main chain is not necessarily clear. However, the reasons include that a sulfonic acid group is easily arranged in a straight chain form and in high density, that the proton conductivity can be increased, and that a change of swelling among molecular chains is hard to occur because packing of the main chain occurs easily and a harder polymer can be produced.

In the present invention, a homopolymer may be formed using only a sulfonic acid group-containing vinyl monomer, preferably vinylsulfonic acid and/or its salt. However, a crosslinking polymer is desirably formed that is insoluble to water, methanol, etc. that permeates when the polymer is used in a fuel cell due to the crosslinking structure that the polymer has.

The method of introducing the crosslinking structure to the third polymer is not especially limited, and a known method can be used. Examples include a method of performing the polymerization reaction using a polymerizable crosslinking agent having two double bonds or more and a method of performing a self-crosslinking due to a drawing of hydrogen at the polymerization. However, the method of performing the polymerization reaction using a polymerizable crosslinking agent having two double bonds or more is easier and preferable.

Examples of the crosslinking agent that lets the above-described monomer undergo the crosslinking reaction include N,N-methylene bis(meth)acrylamide, trimethylolpropane diallylether, pentaerythritol triallylether, oligoethyleneoxide diallylether, divinylbenzene, and triallylamine etc. One of these crosslinking agents can be used independently or two kinds or more can be used together.

The used amount of the above-described crosslinking agent is preferably 1 to 30 molar ratio to 100 moles of the above-described sulfonic acid group-containing vinyl monomer, more preferably 2 to 25 molar ratio, and especially preferably 3 to 20 molar ratio. When the used amount of the crosslinking agent is too low, an uncrosslinked polymer easily elutes, and when it is too high, there is a tendency that the crosslinking agent component becomes hardly compatible and a uniform crosslinked polymer cannot be obtained.

On the other hand, the electrolyte membrane in the present invention is preferably obtained with the manufacturing method in the present invention as described above, and the pores of the porous base are filled with a proton conductive polymer (the third polymer) containing 80% by mole or more of vinylsulfonic acid and/or its salt in a sulfonic acid group-containing vinyl monomer that is a constituting component.

The electrolyte membrane in the present invention contains the above-described proton conductive polymer having vinylsulfonic acid and/or its salt and a crosslinking agent as constituting components, and preferably contains the crosslinking agent at 1 to 30 molar ratio to 100 moles of vinylsulfonic acid and/or its salt. Further, the above-described proton conductive polymer is preferably chemically bonded on the surface of the inside of the pores of the above-described porous base.

For the used amount of the above-described crosslinking agent, the concentration of the crosslinking agent in the monomer solution for filling is preferably 5 to 40% by weight, and more preferably 5 to 25% by weight. When the amount of the crosslinking agent is too low, an uncrosslinked polymer easily elutes, and when it is too high, there is a tendency that the crosslinking agent component becomes hardly compatible and a uniform crosslinked polymer can hardly obtained.

In the electrolyte membrane in the present invention, the above-described porous base is made by crosslinking a resin composition containing a first polymer containing a polyolefin of weight average molecular weight of 500,000 or more and a second polymer having a reactive functional group, and the permeability coefficient of hydrogen gas at 30° C. is preferably $3.0 \times 10^{-9}$ [$cm^3$ (STP)·cm/(s·$cm^2$·cmHg)] or less. The permeability coefficient of hydrogen gas is more preferably $2.0 \times 10^{-9}$ [$cm^3$ (STP)·cm/(s·$cm^2$·cmHg)] or less.

Further, in the present invention, when the porous base is filled with electrolyte and polymerized, it is preferably filled with 80 parts by weight or more of the third polymer to 100 parts by weight of the original porous base, and more preferably 100 parts by weight or more. This weight increase ratio shows the degree of filling of the electrolyte to the pores of the porous base, and when it is too low, the density of an ion exchange group included in the electrolyte becomes small and sufficient proton conductivity cannot be obtained. Further, because voids are left inside of the pores in the porous base and the permeation of hydrogen gas becomes easy, the permeation of hydrogen gas cannot be suppressed sufficiently. Further, in the case of filling the pores with more electrolyte than the amount of which the voids are filled sufficiently, because the porous base is stretched out to the thickness direction due to the force of the electrolyte swelling, the resin constituting the porous base is oriented and comes to have a high elasticity, the effect of suppressing the swelling of the electrolyte by the resin of the porous base can be obtained. Hereby, the higher the weight increase ratio becomes, the higher the impermeability of hydrogen gas becomes.

The electrolyte membrane in the present invention is preferably used in a solid polymer fuel cell, that is, a methanol fuel cell including a direct type methanol solid polymer fuel cell or a modified type methanol solid polymer fuel cell and a pure hydrogen gas type fuel cell using hydrogen gas.

Here, the constitution of the solid polymer fuel cell is briefly explained. The solid polymer fuel cell consists of an electrolyte sandwiched with a cathode, an anode, and both electrodes. The fuel cell may be a modified type methanol fuel cell by having a modifier in the anode side.

The cathode can be made to a traditionally known constitution, and for example can consist of a catalyst layer and a supporting layer supporting the catalyst layer in the order from the electrolyte side. Further, the anode can also be made to a traditionally known constitution, and for example can consist of a catalyst layer and a supporting layer supporting the catalyst layer in the order from the electrolyte side.

EXAMPLES

The present invention is explained by giving examples and comparative examples below. However, the present invention is not limited by these examples at all. Moreover, the testing method in the examples is as follows.

(Weight Average Molecular Weight)

Using gel permeation chromatography (GPC) equipment, the molecular weight distribution is measured in the condition of a column temperature 140° C. and an eluent o-dichlorobenzene.

(Film Thickness)

It is measured with a 1/10000 direct-reading dial-type film thickness measuring instrument.

(Void Ratio)

Using the thickness measured with the 1/10000 direct-reading dial-type film thickness measuring instrument, a value calculated with the following equation A from weight W per unit area S of the film, average thickness t, and density d is used.

$$[\text{Void ratio (\%)}]=(1-(10^4 \times W/S/t/d)) \times 100 \qquad \text{Equation A}$$

(Measurement of Proton Conductivity)

After the film is swollen in water (temperature: 25° C.), a sample for measuring proton conductivity is produced by sandwiching the film with two platinum foil electrodes, and an impedance measurement is performed with HP 4192A manufactured by Hewlett-Packard Development Company, L. P. The range of measurement frequency is 10 kHz to 1 MHz. The real number part of the obtained impedance is plotted on an x-axis, the imaginary number part on a y-axis, and the minimum value of the real number part is made to be the film resistance R ($\Omega$). The thickness of the film when it is swollen is made to be d ($\mu$m), proton conductivity $\sigma$ (S/cm) can be obtained from Equation B.

$$\sigma = 10^{-4} \times d/R \qquad \text{Equation B}$$

(Manufacture of MEA)

Using a platinum carrying carbon (TEC10E50E manufactured by Tanaka Kikinzoku Kogyo) for an oxygen electrode and a platinum-ruthenium alloy carrying carbon (TEC61E54 manufactured by Tanaka Kikinzoku Kogyo) for a fuel electrode respectively, a polymer electrolyte solution (Nafion 5% solution manufactured by DuPont) and polytetrafluoroethylene dispersion are compounded in these catalyst powders, water is added appropriately, stirred, and a paint for a reactive layer is obtained. This is printed on one side of a carbon paper (TGP-H-060 manufactured by Toray Industries, Inc.) with a screen printing method, dried, and made to be an electrode. At that time, the amount of platinum in the oxygen electrode side is made to be 1 mg/cm$^2$ and the total amount of platinum and ruthenium in the fuel electrode side is made to be 3 mg/cm$^2$. These are layered with the paint face inside in the center part of the electrolyte membrane, heat-pressed at 130° C., and a membrane electrode assembly for a fuel cell (MEA) is manufactured. This is incorporated into a fuel cell single cell, operated in various conditions, and the performance is confirmed.

(Fuel Cell Test Using Pure Hydrogen Gas)

The operation condition is as follows when the MEA manufactured by using the electrolyte membranes obtained in the Examples and Comparative Examples is incorporated in a pure hydrogen type fuel cell single cell. The fuel is made to be hydrogen gas, and the oxidizing agent is made to be pure oxygen. The cell temperature is made to be 50° C. The operation is performed at coulemetric density of 0.1 A/cm$^2$ with an electronic loading instrument, and voltage and output characteristics are measured.

(Fuel Cell Test Using Methanol)

The operation condition is as follows when the MEA manufactured by using the electrolyte membranes obtained in the Examples and Comparative Examples is incorporated in a direct methanol type fuel cell single cell. The fuel is made to be a 2% by mol methanol aqueous solution, and the oxidizing agent is made to be pure oxygen. The cell temperature is made to be 70° C. The operation is performed at coulemetric density of 0.1 A/cm$^2$ with an electronic loading instrument, and voltage and output characteristics are measured.

(Weight Increase Ratio)

The weight increase ratio $\alpha$ at filling is calculated by the following Equation C when the dry weight of the porous base before being filled with the electrolyte is ma and the dry weight after filling is mb.

$$\alpha = (mb-ma)/ma \times 100 \qquad \text{Equation C}$$

(Hydrogen Gas Permeability Test)

For the permeation rate of hydrogen gas, the electrolyte membranes are loaded in a gas permeation testing machine in the state that the electrolyte membrane is placed in the atmosphere at 30° C. and 50% humidity. Both sides of one membrane are kept in vacuum, one side of an another membrane is filled with hydrogen gas at 30° C., the change of decompression degree in the vacuum side with time is measured, and the volume of hydrogen gas is calculated that is permeated from the volume capacity of the vacuum side. The gas permeability coefficient P [cm$^3$ (STP)·cm/(s·cm$^2$·cmHg)] is obtained from the following Equation D as the permeating amount of hydrogen gas being p, the measuring time being t, the thickness of the electrolyte membrane being L, the permeation area being A, the gas pressure in the high pressure side being Pa, and the gas pressure in the low pressure side being Pb.

$$P = (p/t) \times (L/A) \times \{1/(Pa-Pb)\} \qquad \text{Equation D}$$

(Maximum Power by Fuel Cell Using Pure Hydrogen Gas)

The operation condition is as follows when the MEA manufactured using the electrolyte membranes obtained in the Examples, Reference Examples, and Comparative Examples is incorporated in a pure hydrogen type fuel cell single cell. The fuel is made to be hydrogen gas, and the oxidizing agent is made to be pure oxygen. The maximum power density is obtained by measuring voltage while the current density is changed in the condition of a hydrogen gas flowing amount: 350 mL/min, an oxygen gas flowing amount: 500 ml/min (a humidifier: 28° C., a pipe: 35° C., and the entrance: 28° C. in both electrode sides), and a cell temperature: 50° C.

Preparation Example 1

16 parts by weight of a polymer composition consisting of 3% by weight of powder of a ring-opened polymer of norbornen (Norsorex NB manufactured by Atofina in France, weight average molecular weight of 2,000,000 or more), 16% by weight of a thermoplastic elastomer (TPE824 manufactured by Sumitomo Chemical, Co., Ltd.), and 81% by weight of ultra high molecular weight polyethylene of weight average molecular weight 1,500,000 and 84 parts by weight of liquid paraffin were mixed uniformly in a slurry form, and dissolved and kneaded for about 60 minutes using a small kneader at temperature of 160° C. After that, the kneaded matter of these was sandwiched with rolls or metal plates cooled at 0° C., and rapidly cooled in a sheet form. The rapidly cooled sheet-formed resin of these was heat-pressed at a temperature of 115° C. until the sheet thickness became 0.5 mm, biaxially drawn to 4.5 times lengthwise and 4.5 times crosswise at the same time at a temperature of 115° C., and a desolventizing treatment was performed using heptane. After that, the obtained micro-porous film was heat-treated in air at 85° C. for 6 hours, additionally heat-treated at 116° C. for 2 hours, and Porous Base A-1 by the present invention was obtained. The thickness of this porous base was 17 μm and the void ratio was 39%.

Example 1

An aqueous solution was made in which a mixed monomer of 90% by mole of vinylsulfonic acid (hereinafter, abbreviated as "VSA", manufactured by Asahi Kasei Finechem Co., Ltd., purity 98%) and 10% by mole of a crosslinking agent: methylene bisacrylamide was diluted with water to 80% by weight, and a solution was prepared in which 1% by mole of a water-soluble azo-based initiator (V-50 manufactured by Wako Pure Chemical Industries, Ltd.) was added to 100% by mole of the total amount of VSA and methylene bisacrylamide. The membrane base A-1 was impregnated with this solution, it was irradiated with visible light for 6 minutes, and then heated for 18 hours in an oven of 50° C.

Figure 1:
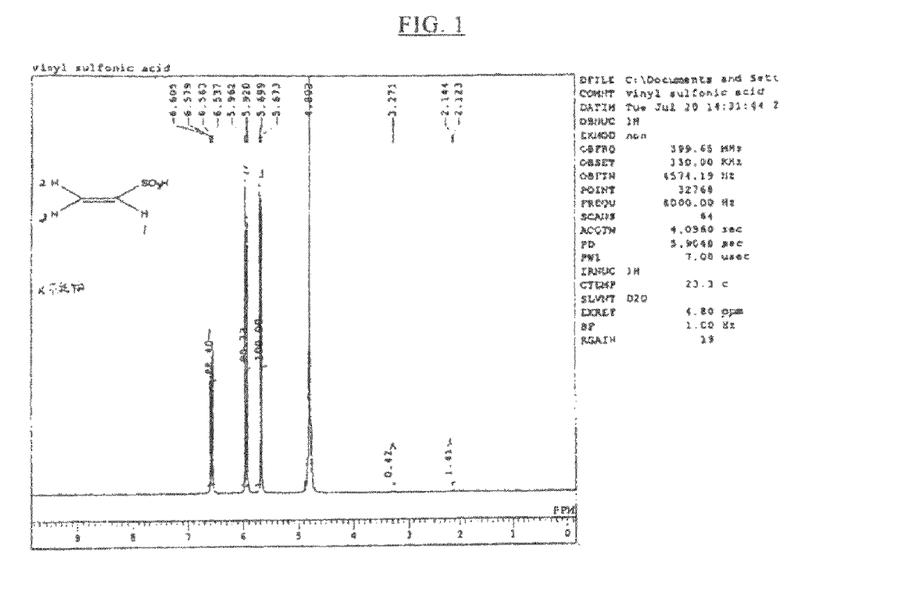
FIG. 1 is a graph showing a NMR chart of vinylsulfonic acid used in the Examples.

After that, excess polymers on the surface of the membrane were removed, the membrane was washed sufficiently with distilled water, dried in an oven of 50° C., and Membrane B-1 was obtained. The proton conductivity and the fuel cell performance of this membrane were obtained by measurements. Moreover, a NMR chart of vinylsulfonic acid used in this Example is shown in FIG. 1 (FT-NMR with LA400 manufactured by JEOL, Ltd.), and impurities were confirmed to be a very small amount.

Example 2

An aqueous solution was made in which a mixed monomer of 95% by mole of VSA and 5% by mole of a crosslinking agent: methylene bisacrylamide was diluted with water to 80% by weight, and a solution was prepared in which 1% by mole of a water-soluble azo-based initiator (V-50 manufactured by Wako Pure Chemical Industries, Ltd.) was added to 100% by mole of the total amount of VSA and methylene bisacrylamide. The membrane base A-1 was impregnated with this solution, it was irradiated with a visible light for 6 minutes, and then heated for 18 hours in an oven of 50° C. After that, excess polymers on the surface of the membrane were removed, the membrane was washed sufficiently with distilled water, dried in an oven of 50° C., and Membrane B-2 was obtained. The proton conductivity and the fuel cell performance of this membrane were obtained by measurements.

Comparative Example 1

An aqueous solution was made in which a mixed monomer of 90% by mole of sodium vinylsulfonate (manufactured by Tokyo Chemical Industries Co., Ltd.: purity 71%) and 10% by mole of a crosslinking agent: methylene bisacrylamide was diluted with water to 50% by weight, and a solution was prepared in which 1% by mole of a water-soluble azo-based initiator (V-50 manufactured by Wako Pure Chemical Industries, Ltd.) was added to 100% by mole of the total amount of VSA and methylene bisacrylamide. The membrane base A-1 was impregnated with this solution, it was irradiated with visible light for 6 minutes, and then heated for 18 hours in an oven of 50° C. However, the polymerization did not proceed and Membrane B-3 could not be obtained.

Comparative Example 2

An aqueous solution was made in which a mixed monomer of 47.5% by mole of 2-acrylamide-2-methylpropane sulfonic acid (hereinafter, abbreviated as "ATBS"), 47.5% by mole of VSA, and 5% by mole of a crosslinking agent: methylene bisacrylamide was diluted with water to 50% by weight, and a solution was prepared in which 1% by mole of a water-soluble azo-based initiator (V-50 manufactured by Wako Pure Chemical Industries, Ltd.) was added to 100% by mole of the total amount of ATBS and methylene bisacrylamide. The membrane base A-1 was impregnated with this solution, it was irradiated with visible light for 6 minutes, and then heated for 18 hours in an oven of 50° C. After that, excess polymers on the surface of the membrane were removed, the membrane was washed sufficiently with distilled water, dried in an oven of 50° C., and Membrane B-4 was obtained. The proton conductivity and the fuel cell performance of this membrane were obtained by measurements.

Comparative Example 3

Nafion115 (manufactured by DuPont) was used as Membrane B-5. The proton conductivity and the fuel cell performance of this membrane were obtained by measurements.

Comparative Example 4

Nafion211 (manufactured by DuPont) was used as Membrane B-6. The proton conductivity and the fuel cell performance of this membrane were obtained by measurements.

Figure 2:
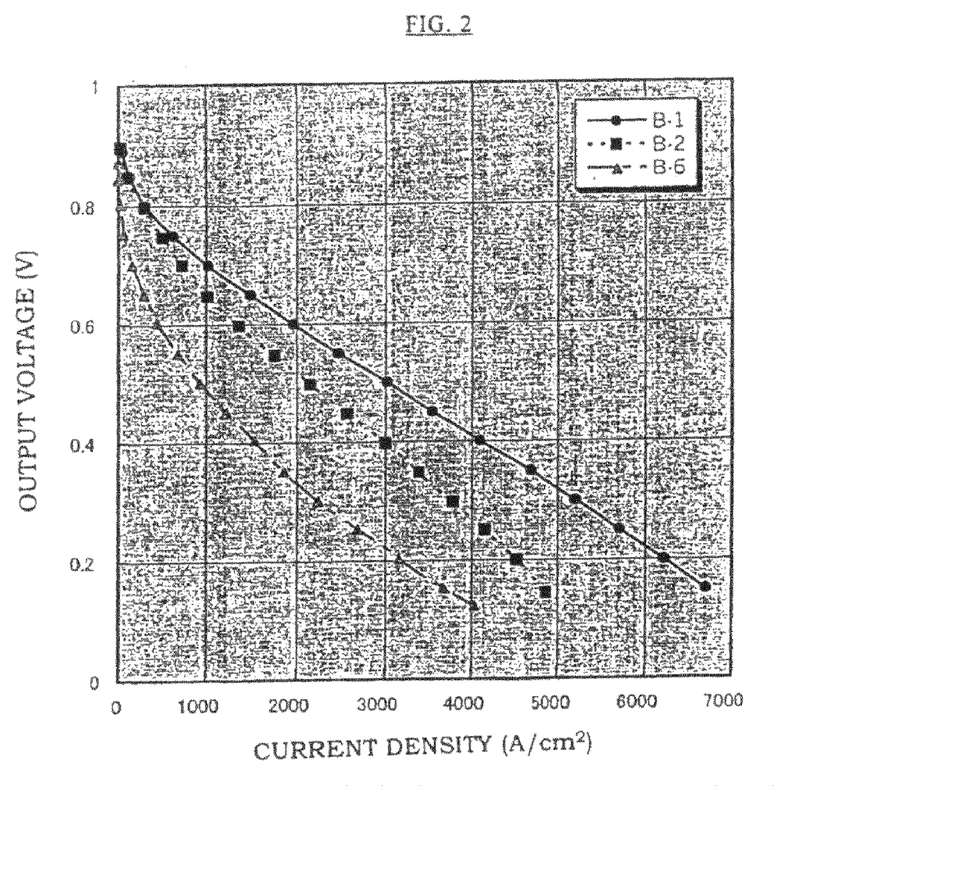
FIG. 2 is a graph showing a result of the output voltage in a fuel cell test using pure hydrogen gas in Examples 1 and 2 and Comparative Example 4.
Figure 3:
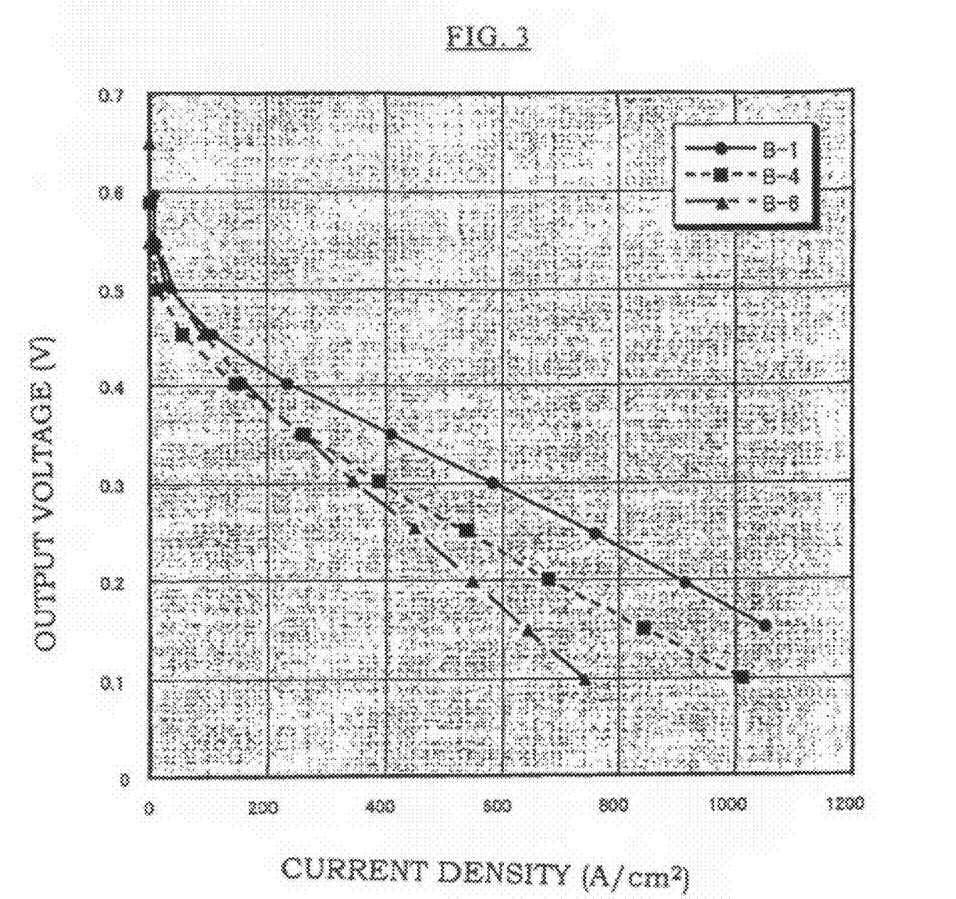
FIG. 3 is a graph showing a result of the output voltage in a fuel cell test using methanol in Example 1 and Comparative Examples 2 and 4.

The characteristics of the membranes obtained in the above Examples, etc is shown in Table 1. Further, the result of the output voltage in a fuel cell test using pure hydrogen gas in Examples 1 and 2 and Comparative Example 4 is shown in FIG. 2. The result of the output voltage in a fuel cell test using methanol in Example 1 and Comparative Examples 2 and 4 is shown in FIG. 3.

TABLE 1

|  | MEMBRANE No. | THICKNESS (μm) | PROTON CONDUCTIVITY (S/cm) |
|---|---|---|---|
| EXAMPLE 1 | B-1 | 24 | 0.117 |
| EXAMPLE 2 | B-2 | 24 | 0.09 |
| COMPARATIVE EXAMPLE 1 | B-3 | Membrane could not be formed. | Membrane could not be formed. |
| COMPARATIVE EXAMPLE 2 | B-4 | 24 | 0.079 |
| COMPARATIVE EXAMPLE 3 | B-5 | 130 | 0.043 |
| COMPARATIVE EXAMPLE 4 | B-6 | 25 | 0.04 |

As shown in Table 1, it is found that the electrolyte membrane obtained by the present invention has a superior proton conductivity compared with a Nafion membrane used often as a fluorine-based electrolyte membrane and a copolymer including a small amount of vinylsulfonic acid component, and high output can be obtained in a fuel cell using methanol and hydrogen as a fuel. Further, from the result of Comparative Example 1, when the polymerization was tried after impregnating with vinylsulfonic acid with low purity that is generally on the market, the polymerization is found not to proceed sufficiently.

Example 3

Hydrophilization of the base membrane was performed by weighing the weight of the porous base membrane A-1, immersing it in 0.5% by weight of a sodium dodecylbenzenesulfonate aqueous solution, performing an ultrasound treatment and a decompression and degassing treatment in the state of immersing, pulling it out, and removing water droplets.

The electrolyte monomer solution for filling was made by mixing 70% by weight of vinylsulfonic acid (hereinafter, abbreviated as "VSA", manufactured by Asahi Kasei Finechem Co., Ltd., purity 98%) and a crosslinking agent: N,N'-methylene-bisacrylamide 10% by weight while maintaining 20% by weight of a sodium dodecylbenzenesulfonate aqueous solution of concentration 0.5% by weight at 20° C. or less, and then adding a water-soluble azo-based initiator (V-50 manufactured by Wako Pure Chemical Industries, Ltd.) to 100% by mole of the total amount of VSA and methylene bisacrylamide to be 1% by mole. The decompression operation was performed while maintaining this monomer solution 20° C. or less, and the degassing treatment was performed. The above-described membrane base A-1 was immersed in this solution, the degassing treatment by the decompression operation was further performed, the irradiation with visible light was performed for 6 minutes, and the polymerization treatment of the electrolyte monomer was performed by heating for 18 hours in an oven of 50° C. The immersion of this membrane base into the monomer solution, degassing by the decompression operation, and polymerization treatment by heating were repeated one more time (two times in total).

After that, excess polymers on the surface of the membrane were removed, the membrane was washed sufficiently with distilled water, dried in an oven of 50° C., and Membrane C-1 was obtained. The weight increase ratio of this membrane was calculated, and the proton conductivity, the hydrogen gas permeability coefficient, and the maximum cell output were obtained by measurements.

Example 4

Hydrophilization of the base membrane was performed by weighing the weight of the porous base membrane A-1, immersing it in 0.5% by weight of a sodium dodecylbenzenesulfonate aqueous solution, performing an ultrasound treatment and a decompression and degassing treatment in the state of immersing, pulling it out, and removing water droplets.

The electrolyte monomer solution for filling was made by mixing 83% by weight of VSA and 5% by weight of a crosslinking agent: N,N'-methylene-bisacrylamide while maintaining 12% by weight of a sodium dodecylbenzenesulfonate aqueous solution of concentration 0.5% by weight at 20° C. or less, and then adding a water-soluble azo-based initiator (V-50 manufactured by Wako Pure Chemical Industries, Ltd.) to 100% by mole of the total amount of VSA and methylene bisacrylamide to be 1% by mole. The decompression operation was performed while maintaining this monomer solution 20° C. or less, and the degassing treatment was performed. The above-described membrane base A-1 was immersed in this solution, the degassing treatment by the decompression operation was further performed, the irradiation with visible light was performed for 6 minutes, and the polymerization treatment of the electrolyte monomer was performed by heating for 18 hours in an oven of 50° C.

After that, excess polymers on the surface of the membrane were removed, the membrane was washed sufficiently with distilled water, dried in an oven of 50° C., and Membrane C-2 was obtained. The weight increase ratio of this membrane was calculated, and the proton conductivity, the hydrogen gas permeability coefficient, and the maximum cell output were obtained by measurements.

Reference Example 1

Hydrophilization of the base membrane was performed by weighing the weight of the porous base membrane A-1, immersing it in 0.5% by weight of a sodium dodecylbenzenesulfonate aqueous solution, performing an ultrasound treatment and a decompression and degassing treatment in the state of immersing, pulling it out, and removing water droplets.

The electrolyte monomer solution for filling was made by mixing 70% by weight of VSA and 10% by weight of a crosslinking agent: N,N'-methylene-bisacrylamide while maintaining 20% by weight of a sodium dodecylbenzenesulfonate aqueous solution of concentration 0.5% by weight at 20° C. or less, and then adding a water-soluble azo-based initiator (V-50 manufactured by Wako Pure Chemical Industries, Ltd.) to 100% by mole of the total amount of VSA and methylene bisacrylamide to be 1% by mole. The above-described membrane base A-1 was immersed in this solution, the irradiation with visible light was performed for 6 minutes, and the polymerization treatment of the electrolyte monomer was performed by heating for 18 hours in an oven of 50° C.

After that, excess polymers on the surface of the membrane were removed, the membrane was washed sufficiently with distilled water, dried in an oven of 50° C., and Membrane C-3 was obtained. The weight increase ratio of this membrane was calculated, and the proton conductivity, the hydrogen gas permeability coefficient, and the maximum cell output were obtained by measurements.

Reference Example 2

Hydrophilization of the base membrane was performed by weighing the weight of the porous base membrane A-1, immersing it in 0.5% by weight of a sodium dodecylbenzenesulfonate aqueous solution, performing an ultrasound treatment and a decompression and degassing treatment in the state of immersing, pulling it out, and removing water droplets.

The electrolyte monomer solution for filling was made by mixing 44% by weight of VSA and 6% by weight of a crosslinking agent: N,N'-methylene-bisacrylamide while maintaining 50% by weight of a sodium dodecylbenzenesulfonate aqueous solution of concentration 0.5% by weight at 20° C. or less, and then adding a water-soluble azo-based initiator (V-50 manufactured by Wako Pure Chemical Industries, Ltd.) to 100% by mole of the total amount of VSA and methylene bisacrylamide to be 1% by mole. The above-described membrane base A-1 was immersed in this solution, the irradiation with visible light was performed for 6 minutes, and the polymerization treatment of the electrolyte monomer was performed by heating for 18 hours in an oven of 50° C. However, it could not be polymerized.

Comparative Example 5

Nafion115 (manufactured by DuPont) was used as Membrane C-5. The proton conductivity, the hydrogen gas permeability coefficient, and the maximum cell output of this membrane were obtained by measurements.

Comparative Example 6

Nafion211 (manufactured by DuPont) was used as Membrane C-6. The proton conductivity, the hydrogen gas permeability coefficient, and the maximum cell output of this membrane were obtained by measurements.

The characteristics of the membranes obtained in the above Examples are shown in Table 2.

TABLE 2

| MEMBRANE No. | THICKNESS (μm) | WEIGHT INCREASE RATIO (%) | PROTON CONDUCTIVITY (S/cm) | HYDROGEN GAS PERMEABILITY ($cm^3$(STP)cm/scm$^2$cm Hg) | MAXIMUM CELL OUTPUT (mW/cm$^2$) |
|---|---|---|---|---|---|
| C-1 | 24 | 125 | 0.117 | $1.3 \times 10^{-9}$ | 1640 |
| C-2 | 24 | 113 | 0.090 | $1.4 \times 10^{-9}$ | 1200 |
| C-3 | 24 | 68 | 0.079 | $4.6 \times 10^{-9}$ | — |
| C-4 | Membrane could not be formed. | — | — | — | — |
| C-5 | 130 | — | 0.043 | $5.9 \times 10^{-9}$ | — |
| C-6 | 25 | — | 0.040 | $6.5 \times 10^{-9}$ | 660 |

As shown in Table 2, because the electrolyte membrane obtained by the present invention has a superior proton conductivity compared with a Nafion membrane (Comparative Examples 5 and 6) used often as a fluorine-based electrolyte membrane and a high hydrogen gas impermeability, when a solid polymer fuel cell is manufactured, a superior fuel cell having a high output characteristics can be provided.

Contrary to this, in Reference Example 1 in which the decompression and degassing treatment was not performed, the proton conductivity and the hydrogen gas impermeability deteriorate, and in Reference Example 2 in which the monomer concentration of the filling solution is low, the polymerization was difficult.

The invention claimed is:

1. A method for producing an electrolyte membrane comprising impregnating a porous base with a solution containing a sulfonic acid group-containing vinyl monomer, degassing the porous base, and then polymerizing the monomer, wherein:
    80% by mole or more of vinyl sulfonic acid having a purity of 90% or more, and/or a salt thereof is contained as the sulfonic acid group-containing vinyl monomer;
    the concentration of the vinyl sulfonic acid and/or a salt thereof in the solution is set at 35% by weight or more;
    degassing the porous base comprises applying reduced pressure to the impregnated porous base; and
    the steps of impregnating, degassing and polymerizing are performed two or more times.

2. The method for producing an electrolyte membrane according to claim 1, wherein the solution contains a crosslinking agent at a ratio of 1 to 30 moles to 100 moles of the sulfonic acid group-containing vinyl monomer.

3. The method of claim 1, wherein the resultant polymer containing said sulfonic acid group-containing vinyl monomer is chemically bonded to said porous base.

4. The method for producing an electrolyte membrane according to claim 1, wherein the porous base is made by crosslinking a resin composition including a first polymer containing a polyolefin with weight average molecular weight of 500,000 or more and a second polymer having a reactive functional group.

5. An electrolyte membrane, wherein pores of the porous base are filled with a proton conductive polymer containing 80% by mole or more of vinyl sulfonic acid and/or a salt thereof in the sulfonic acid group-containing vinyl monomer that is a constituent component;
    the porous base is made by crosslinking a resin composition including a first polymer containing a polyolefin with a weight average molecular weight of 500,000 or more and a second polymer having a reactive functional group;
    100 parts by weight of the porous base is filled with 80 parts by weight or more of the proton conductive polymer; and
    the electrolyte membrane has a permeability coefficient of hydrogen gas at 30° C. of $3.0 \times 10^{-9}$ [$cm^3$ (STP)·cm/(s·cm$^2$·cmHg)] or less.

6. The electrolyte membrane according to claim 5, wherein the proton conductive polymer has vinylsulfonic acid and/or a salt thereof and a crosslinking agent as the constituent components, and contains a crosslinking agent at a ratio of 1 to 30 moles to 100 moles of the vinylsulfonic acid and/or a salt thereof.

7. A solid polymer fuel cell made by using any of the electrolyte membranes according to claim 5.

8. A solid polymer fuel cell made by using any of the electrolyte membranes according to claim 6.

9. The electrolyte membrane according to claim 5, wherein the permeability coefficient of hydrogen gas at 30° C. is $2.0 \times 10^{-9}$ [$cm^3$ (STP)·cm/(s·cm$^2$·cmHg)] or less.

10. The electrolyte membrane according to claim 5, wherein 100 parts by weight of the porous base is filled with 100 parts by weight or more of the proton conductive polymer.

11. A method for producing an electrolyte membrane comprising:
    impregnating a porous base with a solution containing a sulfonic acid group-containing vinyl monomer, wherein the vinyl sulfonic acid group-containing vinyl monomer has a purity of 90% or more, and the concentration of the vinyl sulfonic acid group-containing vinyl monomer in the solution is 35% by weight or more;
    degassing the porous base by applying reduced pressure;
    polymerizing the monomer, wherein the resultant polymer contains 80% by mole or more sulfonic acid group-containing vinyl monomer as the constituting component; and
    the steps of impregnating, degassing and polymerizing are repeated until the porous base is filled with 80 parts by weight or more of the proton conductive polymer to 100 parts by weight of the porous base.

12. The electrolyte membrane according to claim 9, wherein 100 parts by weight of the porous base is filled with 100 parts by weight or more of the proton conductive polymer.

* * * * *

UNITED STATES PATENT AND TRADEMARK OFFICE
CERTIFICATE OF CORRECTION

PATENT NO.       : 7,785,751 B2
APPLICATION NO.  : 11/720742
DATED            : August 31, 2010
INVENTOR(S)      : Kazushige Yamamoto et al.

It is certified that error appears in the above-identified patent and that said Letters Patent is hereby corrected as shown below:

Column 5, line 65; please delete "polynorbornen," and insert --polynorbornene--, therefor.

Column 10, lines 20-23; After "obtained." delete "Further, because voids are left inside of the pores in the porous base and the permeation of hydrogen gas becomes easy, the permeation of hydrogen gas cannot be suppressed sufficiently. Further, in the case of filling the pores with more electrolyte than the amount of which the voids are filled sufficiently, because the porous base is stretched out to the thickness direction due to the force of the electrolyte swelling, the resin constituting the porous base is oriented and comes to have a high elasticity, the effect of suppressing the swelling of the electrolyte by the resin of the porous base can be obtained. Hereby, the higher the weight increase ratio becomes, the higher the impermeability of hydrogen gas becomes." and insert the same on Col. 10, Line 21, as a new paragraph.

Column 11, line 54; please delete "coulemetric" and insert --coulometric--, therefor.

Column 11, line 65; please delete "coulemetric" and insert --coulometric--, therefor.

Column 12, line 40; please delete "500 ml/min" and insert --500 mL/min--, therefor.

Column 12, lines 48-49; please delete "norbornen" and insert --norbornene--, therefor.

Column 13, lines 38-45; After "bisacrylamide." delete "The membrane base A-1 was impregnated with this solution, it was irradiated with a visible light for 6 minutes, and then heated for 18 hours in an oven of 50° C. After that, excess polymers on the surface of the membrane were removed, the membrane was washed sufficiently with distilled water, dried in an oven of 50° C., and Membrane B-2 was obtained. The proton conductivity and the fuel cell performance of this membrane were obtained by measurements." and insert the same on Col. 13, Line 39, as a new paragraph.

Column 15, lines 52-60; After "mole." delete "The decompression operation was performed while maintaining this monomer solution 20° C. or less, and the degassing treatment was performed. The above-described membrane base A-1 was immersed in this solution, the degassing treatment by Signed and Sealed this
Ninth Day of August, 2011

David J. Kappos
*Director of the United States Patent and Trademark Office* the decompression operation was further performed, the irradiation with visible light was performed for 6 minutes, and the polymerization treatment of the electrolyte monomer was performed by heating for 18 hours in an oven of 50° C." and insert the same on Col. 15, Line 53, as a new paragraph.